Feb. 7, 1933.  J. H. FARMER  1,896,442
LAWN MOWER
Filed Aug. 18, 1931   3 Sheets-Sheet 1
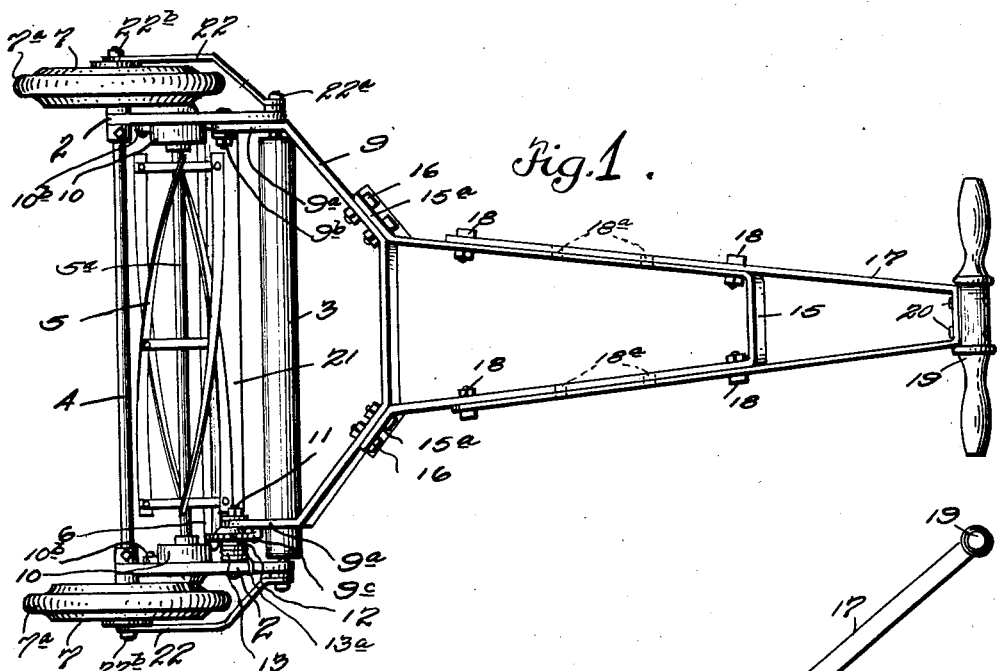
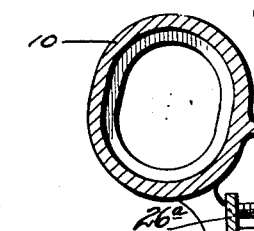
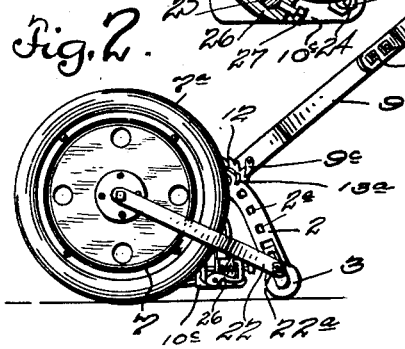
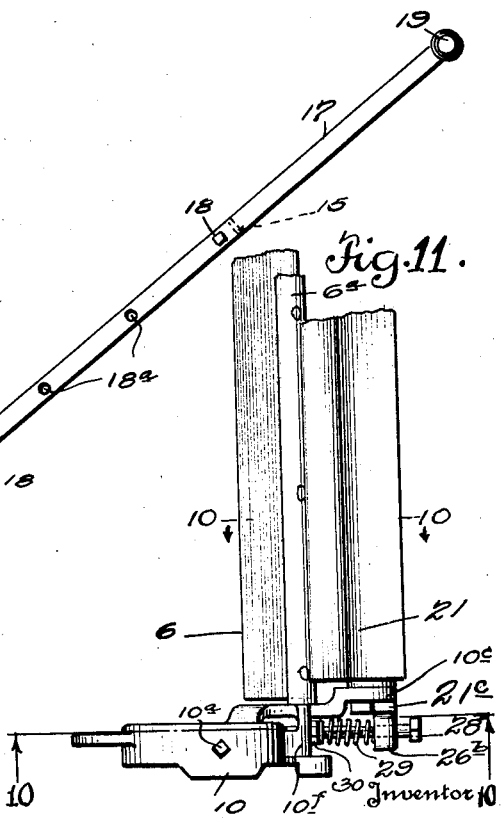

Feb. 7, 1933.   J. H. FARMER   1,896,442
LAWN MOWER
Filed Aug. 18, 1931   3 Sheets-Sheet 2

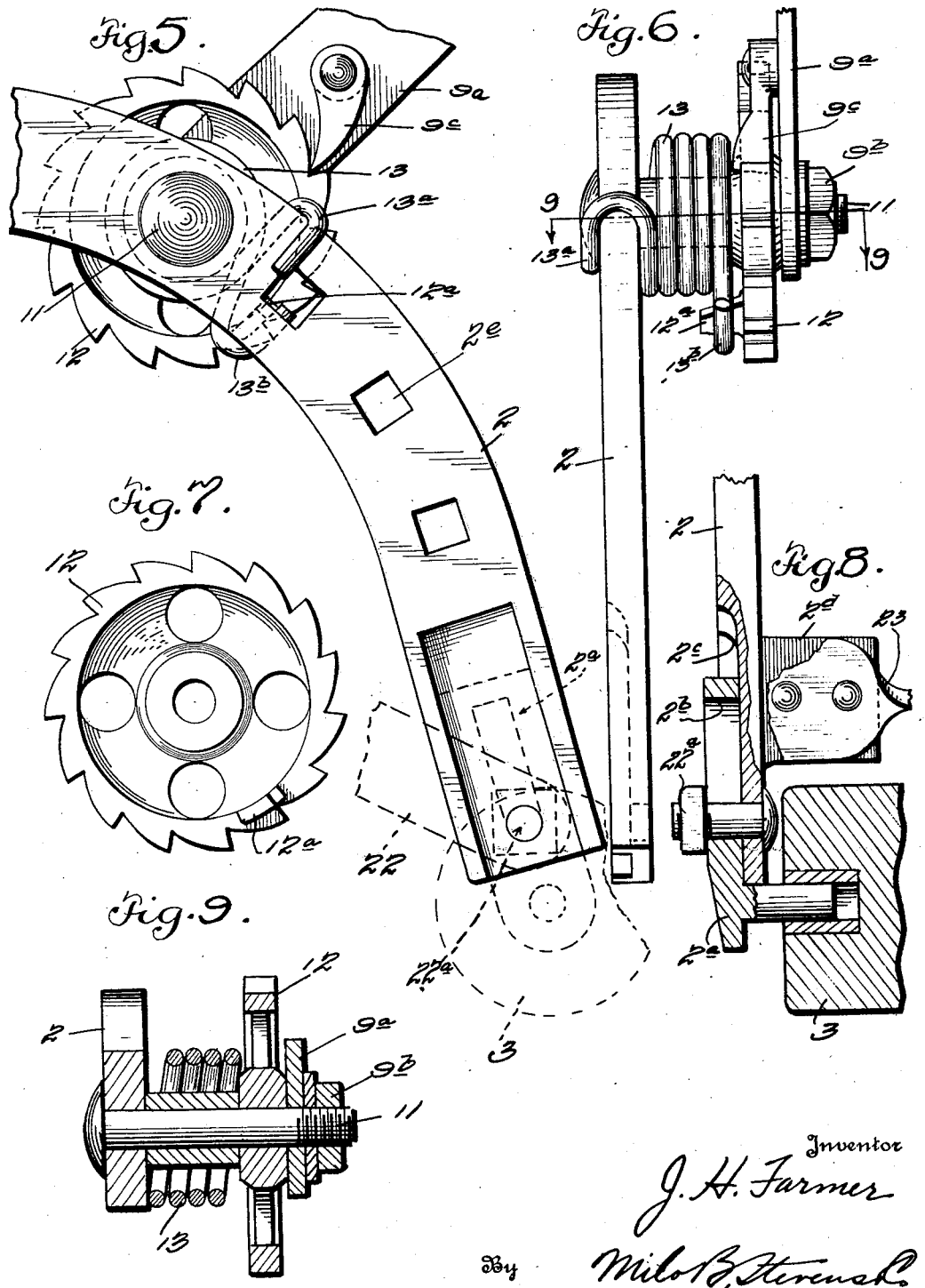

Patented Feb. 7, 1933

1,896,442

UNITED STATES PATENT OFFICE

JOHN H. FARMER, OF RICHMOND, INDIANA

LAWN MOWER

Application filed August 18, 1931. Serial No. 557,931.

My invention relates to improvements in lawnmowers, of the type shown in United States Patent No. 1,172,444, dated February 22, 1916, and has among its objects to provide,—(1) a novel sectional handle which is adjustable as to length, and which preferably includes a novel floating connection with the lawnmower frame,—the nature of the handle mount being such that it may be disposed very close to the ground if desired, and generally adjusted to suit the height of the operator; (2) to provide a novel grass deflector for directing the clippings into a grass catcher, and which deflector may be adjusted relatively of the cutter bar; (3) to provide a novel adjustable cutter bar tensionly supported and readily adjustable, so as to assure proper operative relationship with the cutting reel at all times; and (4) to provide generally, a lawnmower which is simple and light in construction, relatively inexpensive to manufacture, and which will be highly efficient in practical use.

The invention also resides in certain novel features of construction, combination and arrangement of the various parts, and in such modes of operation and methods of use which will be readily apparent as the description proceeds.

It is to be understood that the disclosures herein illustrate what is now regarded as a preferred form of the invention. However, it will be clear that various changes may be made in the specific structure illustrated in the accompanying drawings without, however, departing from the spirit and scope of the subject matter claimed hereinafter.

In the drawings, wherein the same reference characters have been used to designate the same parts in all views, Figure 1 is a top plan view of a lawnmower embodying my invention;

Figure 2 is a side elevational view thereof;

Figure 5 is an enlarged detailed view illustrating one of the roller supporting arches or arms, and the pawl and ratchet connection of the handle thereto;

Figure 6 is a view of the arch and pawl and ratchet construction of Figure 5, but taken at right angles thereto;

Figure 7 is a side elevational view of the ratchet and showing the novel lug structure thereof;

Figure 8 is a detailed view partly in section and showing the adjustable connection of the roller to its supporting arch;

Figure 9 is a cross sectional view taken on the line 9—9 of Figure 6;

Figure 10 is a cross sectional view taken on the line 10—10 of Figure 11, and

Figure 11 is a fragmentary plan view of the cutter bar, deflector, and the supporting and adjusting means therefor.

Figure 3:
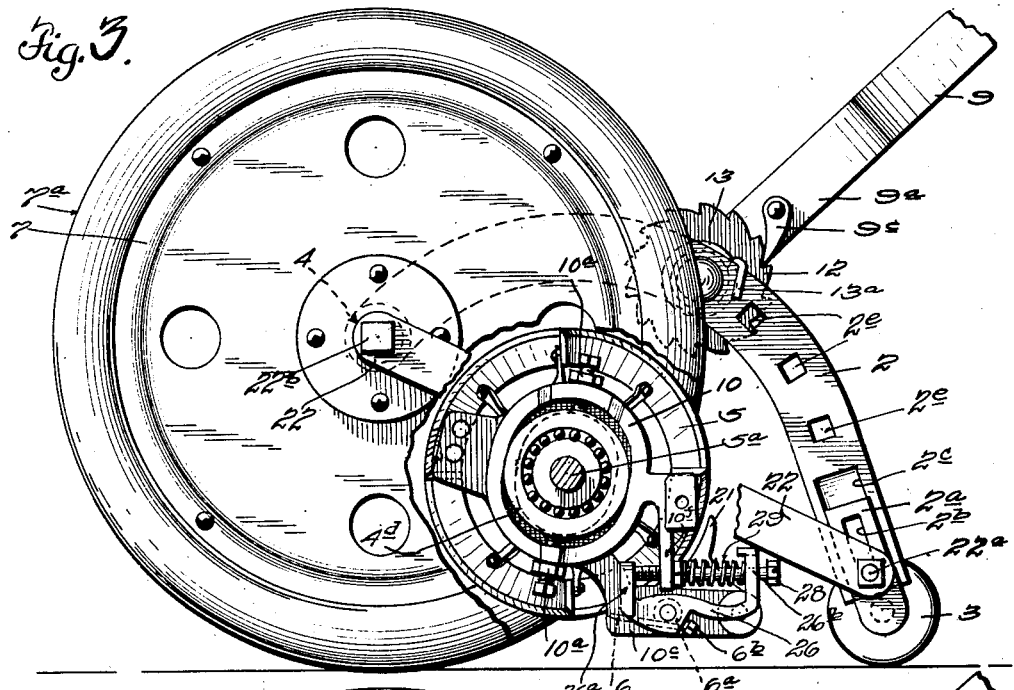
Figure 3 is an enlarged view partly in side elevation and partly broken to illustrate the cutting reel in cross section.

Referring specifically to the drawings numeral 2 denotes a pair of roller supporting arches for the roller 3 while reference character 4 denotes the frame shaft supporting the wheels 7.

Figure 4:
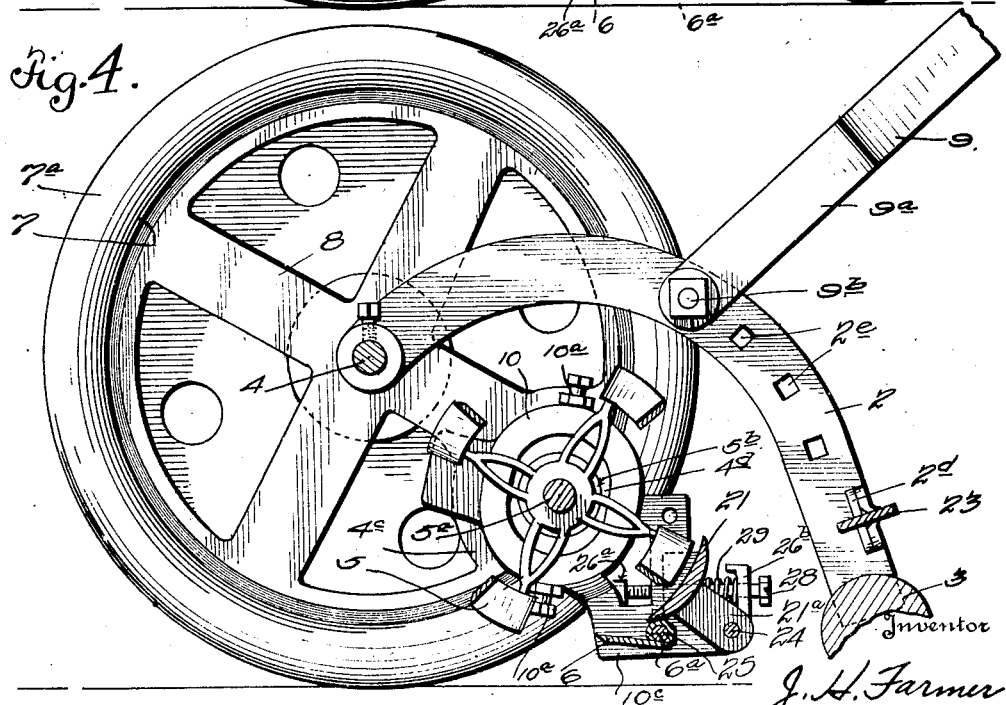
Figure 4 is a view similar to Figure 3, but showing the cutting bar and grass deflector in cross section, and also the roller and the bar which connects the side arches which form elements of the roller support.

The cutting reel is designated as at 5, and is of the usual construction, while the cutter bar 6 is shown in Figure 4 as having a curled rear edge 6$^a$, so that it can be mounted upon its pivot shaft 25.

The shaft 5$^a$ of the reel is mounted in suitable bearings in the side frame members 8 as usual, and there is the conventional pinion drive connection between the reel shaft 5$^a$ and the wheels 7,—which latter, it is to be noted, are provided with rubber tires or the like 7$^a$.

The inner end of the handle terminates in a yoke member 9, having parallel terminal portions 9$^a$, which are pivoted as at 9$^b$, 11, to the roller supporting arch members 2, as best shown in Figure 1.

An important feature of the invention is the mounting of the handle, so as to give it a full floating mount, so that it can be adjusted to a desired angle of inclination depending upon the height of the operator, or the particular work which is to be done.

For instance, it is often very desirable to adjust the handle very close to the ground. The usual lug supporting means for the handle of a mower prevents same from being adjusted close to the ground without elevating the wheels out of traction engagement with the ground.

As shown in Figures 1, 3, 5 and 6, the roller supporting arch 2 has a number of holes 2$^e$ for receiving the squared portions of a bolt 11 upon which is journalled the ratchet wheel 12, with which the swingable pawl 9$^c$ carried by one of terminal portions 9$^a$ of the yoke member 9 is adapted to engage.

In order that the ratchet will be enabled to yield slightly, I provide upon the bolt 11 a coil spring 13 which is disposed between the arch member 2 and ratchet wheel 12, and has one end effectively hooked over the arch member 2, while the other end is offset and provided with the hook 13$^b$ adapted to engage the lateral lug 12$^a$ (see Figures 6 and 7) of the ratchet wheel 12.

It will be apparent from the foregoing that there will be some desirable yielding action in the connection of the handle terminal yoke 9$^a$ with the frame of the mower; also that the handle can be adjusted in any desired position by the moving of dog 9$^c$.

Numeral 10 denotes a pair of cutter bar supporting brackets which are secured as at 10$^b$ to the side frame member 8 of the mower, and which are provided with depending offset portions 10$^c$ which serve to support the cutting bar and the grass deflector which will be referred to more in detail later on.

The bracket members 10 are provided with set screws 10$^a$ for adjusting the elevation of the bracket with respect to the outwardly projecting frame bearing of the reel shaft 5$^a$.

Adverting to the handle again, it will be observed that the inner yoke-like end 9 has secured thereto the diagonally offset ends 15$^a$ of the U-shaped member 15,—there being provided bolts for making the attachment. The outer section of the handle also comprises a substantially U or V-shaped member 17, which is bolted to the legs of the member 15, as indicated at 18,—the members 15, 17, having their legs provided with a number of holes 18$^a$, so that the length of the handle can be varied as occasion may require. The outer end of the section 17 has secured thereto as at 20 the handle bar 19.

It will thus be seen that the handle of the mower not only is swingably adjustable to the desired position, but also may be adjusted as to length. The handle structure is very light, and in addition to the respects mentioned, it is a great deal more satisfactory than the conventional wooden handle.

Considerable difficulty is experienced ordinarily in effectively utilizing a grass catcher accouterment of the lawnmover, owing to the fact that a great deal of grass will slip under the forward edge of the grass catcher, and thus fail to be deposited therein.

With the foregoing in mind, I have provided a grass deflector 21 which is best shown in Figures 3, 4, and 11, and is seen to comprehend a substantially moon-shaped plate as viewed in cross section, and has at its rear surface (at the ends) a pair of supporting arms 21$^a$ which are pivoted upon a shaft 24 carried by the outer end portions of the bracket extensions 10$^c$ (see Figure 4). The lower portion of the deflector 21 will normally rest upon the curled rear portion of the cutter blade 6, so that all grass from the upper portion of the blade will be effectively deflected upwardly and rearwardly to the grass catcher (not shown). Obviously, the adjustment of the deflector 21 can be readily effected through the medium of the jam nuts 21$^c$ on the end of the shaft 24,—one of which nuts is shown in Figure 11. This adjustment will be entirely independent of the adjustment of the cutter blade 6, which will be later described.

The roller mount and arch members 2 are braced or supported by offset strap metal bars 22 connected as at 22$^a$ 22$^b$, to the roller bracket 2$^a$ (Figure 8), and the frame shaft 4.

Referring to Figures 5 and 8, it will be noted that each roller bracket 2$^a$ is slotted as at 2$^b$, and is adapted to be adjusted in the groove 2$^c$ of the arch members 2. The bolt 22$^a$ which connects the strap members 22 to the arch members 2 also secures the roller bracket 2$^a$ in a predetermined adjusted position. A connector bar, preferably of strap metal and designated as at 23 in Figures 4 and 8, connects the arch members 2.

The cutter bar 6 has its curled rear end surrounding the supporting shaft 25 which is carried by the bracket extensions 10$^c$, as indicated in Figure 4, and located just forwardly of the shaft 24, which supports the deflector 21, 21$^a$.

The brackets 10 have their depending lower extended portions 10$^c$ struck inwardly slightly so as to lie below and inwardly of the depending lugs 10$^f$, through which are adapted to be threaded the bolts 28. The bolts 28 pass through the slotted upstanding arm 26$^b$, and which has an upstanding arm 26$^a$ at its opposite end adapted to be engaged by the inner end of the bolt 28. A coil spring 29 surrounds the bolt, and is disposed between the upstanding arm 26$^b$ and the depending lug 10$^f$ of the bracket 10. A nut 30 is adjustably carried by the bolt and forms the stop for the inner end of the spring 29. From the foregoing, it will be evident that the rocker member 26 being rigidly secured to the cutter bar shaft 6$^a$, can be swung for the purpose of adjusting the shaft and cutter bar, which is rigidly carried thereby. The slot in the arm 26$^b$ of the bracket 26 enables the same to move transversely slightly of the bolts 28. It is believed to be obvious that the spring acting upon the nut 30 bearing against the depending lug $10^f$ presses against the arm $26^b$ of the rocker so as to yieldingly hold the cutting bar 6 in a position to be engaged by the blades of the reel 5. The term "yieldingly" is used in a broad sense. The engagement of the inner end of the bolt with the lugs 26 will substantially hold the cutter bar 6 in a set position. What really happens is that the spring 29 acting upon the slotted arm $26^b$ causes the member 26 to rock in a clockwise position, and yieldingly maintains the inner upstanding arm $26^a$ in contact with the inner end of the bolt 28.

From the foregoing description, the advantages and mode of operation of the device will be readily apparent. The cutting reel and drive connection between the frame and wheel 7 is standard, and therefore has not been referred to. Also the frame 8 is more or less standard, and no novelty is claimed therefor.

Having thus described my invention, what I claim as new and desire to secure by Letters Patent is:

1. In a lawnmower, a frame, a handle pivoted to said frame, and a pawl and ratchet mechanism including a spring acting upon said ratchet for adjustably positioning the handle in operative position with respect to said frame.

2. In a lawnmower, comprising a frame, a roller, a pair of supports at each end of said roller and connected to said frame, a handle, pivot means carried by said handle, one support of each of said pairs having a plurality of seats for said pivot means arranged in lineal series, a ratchet carried by one of said pivot means, a spring between said support and ratchet, and coiled about said pivot, one end of said spring being anchored to said support and the other to said ratchet whereby to resist movement of the ratchet in one direction, and a pawl carried by said handle and adapted to engage said ratchet whereby to yieldingly dispose the handle in any one of a plurality of operative positions.

3. In a lawnmower, a frame, a cutter bar, brackets carried by said frame for supporting said cutter bar, said cutter bar having bearings at its ends and engaging said brackets, rockers adjacent the inner surfaces of said brackets and fixedly secured to the bearing ends of said cutter bar for actuating the same, said rockers having upstanding arms at the ends, a depending lug carried by said brackets between said arms, and means including a bolt and spring structure carried by said lug and cooperating with said rocker arms for yieldably holding the cutter bar in adjusted position.

4. In a lawnmower, a frame, a handle pivoted on said frame, a ratchet pivoted on the frame coaxially with said handle, a spring interposed between said frame and ratchet, and a pawl pivotally secured to the handle for adjustably retaining said handle in operative position with respect to said frame.

5. In a lawnmower, a frame, a handle pivoted on said frame, a ratchet pivoted on the frame coaxially with the handle, resilient means to yieldingly restrain the turning movement of the ratchet in one direction, and a pawl secured to the handle for adjustably retaining said handle in operative position with respect to said frame.

6. In a lawnmower, a frame, a handle pivoted on said frame, a ratchet adjustably positioned on said frame, a resilient connection between said frame and ratchet to yieldingly secure the latter to the frame, and a pawl secured to said handle for adjustably retaining said handle in operative position with respect to said frame.

In testimony whereof I affix my signature.

JOHN H. FARMER.